May 6, 1924.
H. LEE
BRAKE BEAM
Filed Nov. 30, 1920   3 Sheets-Sheet 1
1,492,716
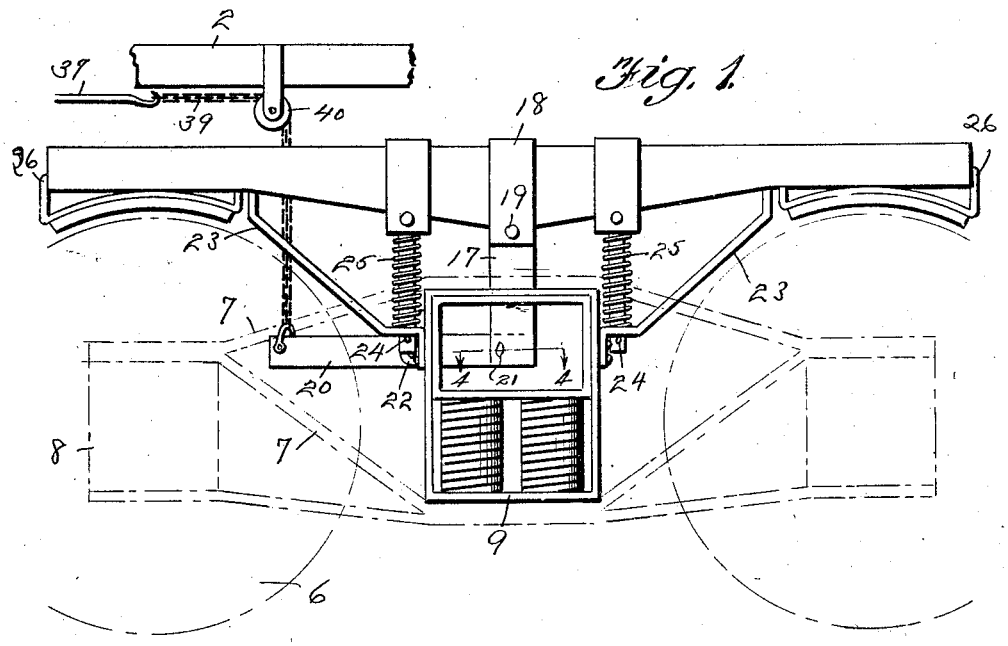
Fig. 1.
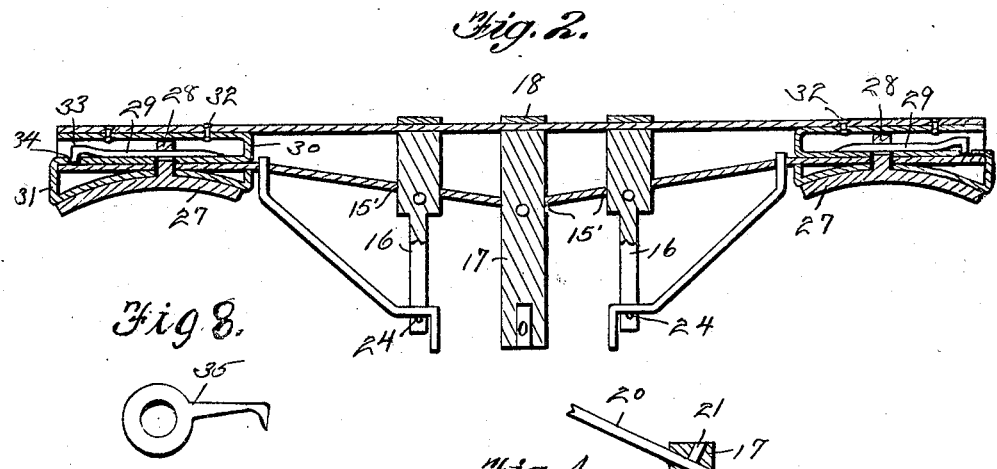
Fig. 2.
Fig. 3.
Fig. 4.
Witnesses
Leroy P. Kauffman.
Frank D. O'Connell
INVENTOR.
HARRY LEE.
BY
Richard B. Owen
ATTORNEY.

May 6, 1924.
H. LEE
BRAKE BEAM
Filed Nov. 30, 1920    3 Sheets-Sheet 3
1,492,716
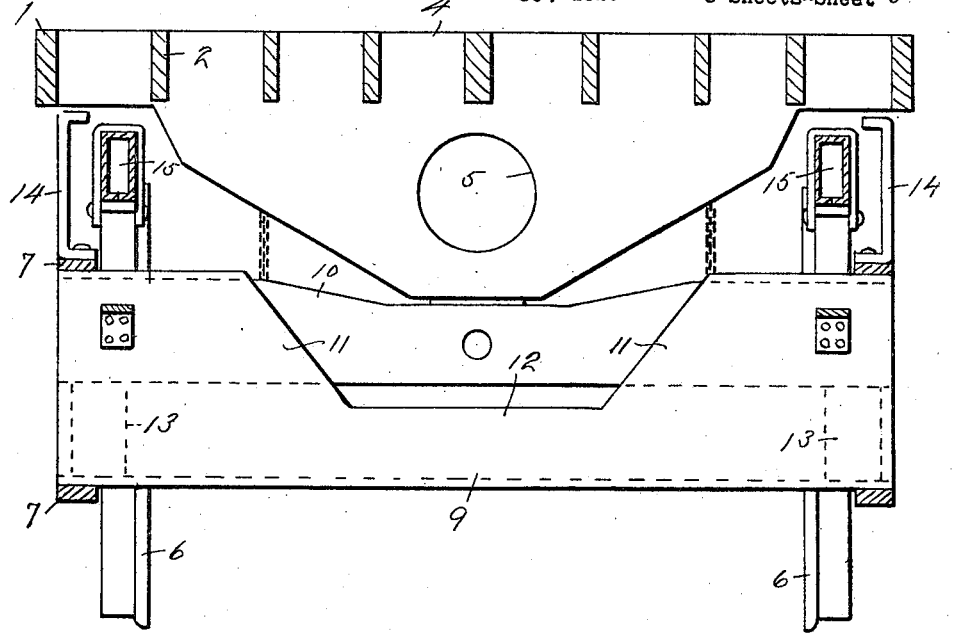
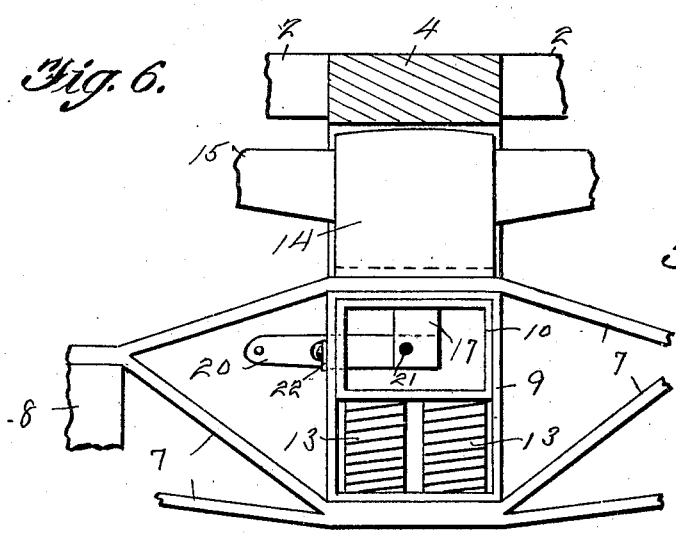
Fig. 6.
Fig. 7.
WITNESSES.
Leroy A. Kauffman.
Frank D. O'Connell
Inventor
HARRY LEE.
By Richard B. Owen.
Attorney Patented May 6, 1924.

1,492,716

UNITED STATES PATENT OFFICE.

HARRY LEE, OF LIVINGSTON, MONTANA.

BRAKE BEAM.

Application filed November 30, 1920. Serial No. 427,328.

*To all whom it may concern:*

Be it known that I, HARRY LEE, a citizen of the United States, residing at Livingston, in the county of Park and State of Montana, have invented certain new and useful Improvements in Brake Beams, of which the following is a specification.

The invention has reference to brake systems for railway rolling stock, and particularly to the manner of applying brakes to the car wheels.

The purpose of the invention is to provide a system of applying the brakes in which safety and economy are essential factors.

An object of the invention is to provide an improved brake mechanism having certain features of construction and arrangement of parts as enable it, when applied to a car frame, to operate without the disadvantages heretofore encountered in brake systems in present use.

A further object of the invention is to provide an improved brake system wherein the brake beams and brake shoes are arranged above the wheels and out of possible contact with frost-lifted crossing planks, lumps of coal or other obstacle-forming objects along the track.

An additional object is to provide a brake appliance of generally improved construction having a part separably associated and detachable for repairs, or replacement without personal inconvenience or risk.

With the above and other objects in view, the invention may be said to reside generally in the details of construction, combination and arrangement of parts as will be hereinafter more fully pointed out and described, reference being had to the accompanying drawings, wherein Figure 1 is a side elevation of a car-truck illustrating the manner in which the brake beams are hung.

Figure 2 is a longitudinal sectional view of the brake beam and brake shoes, disclosing the detachable arrangement of the latter.

Figure 3 is a top plan of one of the truck ends of a car frame, illustrating the method of arranging the elements of the improved brake mechanism.

Figure 4 is a detail view showing the angular junction effected between the brake lever and brake beam arm.

Figure 6 is a view illustrating the manner in which the car body bolster is supported transversely of the truck and truck-bolster.

Figure 7 is a detail view, disclosing the car bearings at the outer end of the truck, and Figure 8 is a view of the brake-shoe key-removing tool.

Figure 5:
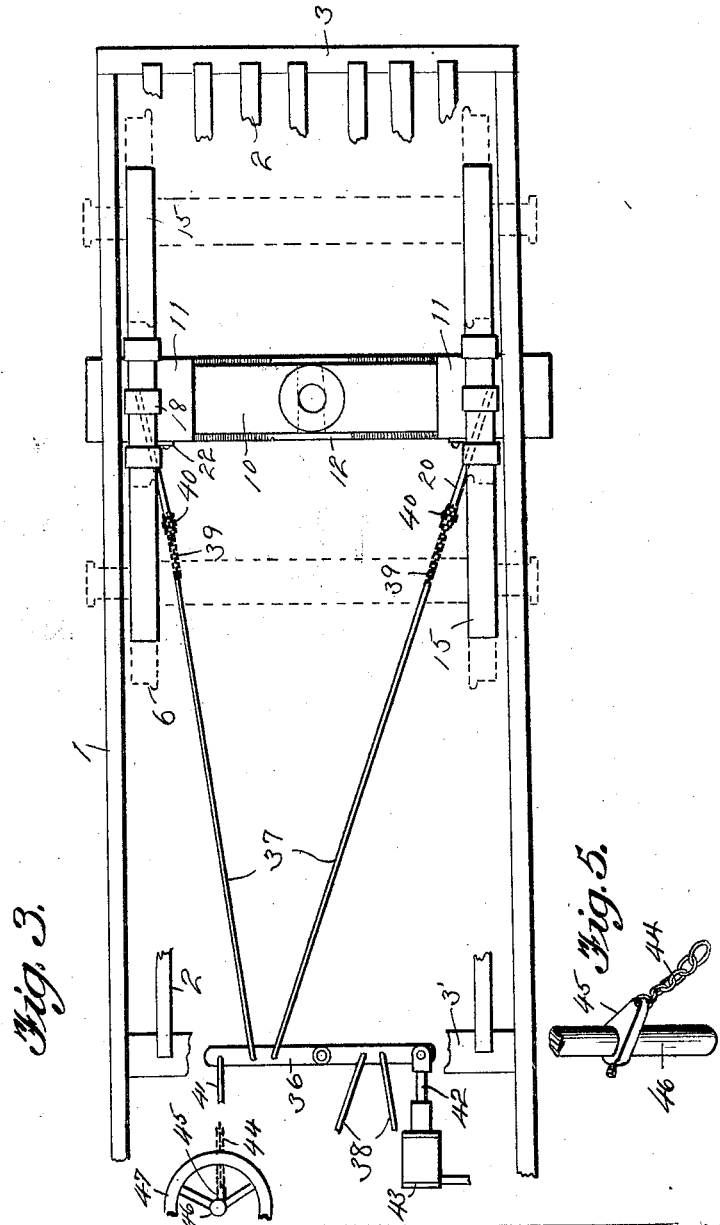
Figure 5 shows the short arm on the brake mast.

In the course of the following explanation of the invention, reference is to be had to the drawings, wherein is shown an end bottom section of a car frame 1, which, as illustrated, is composed of the longitudinally extending floor-sills 2, upon which the car floor is laid, and cross-sills 3 which support the floor-sills. Forming a part of the bottom frame and depending thereunder, adjacent each end are body bolsters or transsoms, such as are usually incorporated in car construction. One of such transoms is indicated at 4, and, as shown, extends crosswise of the car to support the latter upon the car truck. In the present instance, the transom is shown provided with an eye 5 to receive a train line, such as illustrated and described in United States Letters Patent No. 1,320,011, granted to me October 28, 1919. The car truck includes wheels 6 and arch bars or truck sides 7 of any pattern having the usual wheel boxes 8.

The arch bars receive and support the end of a bolster casing 9 in which is mounted the truck-bolster 10. The casing consists of tubular, box-like end portions 11 integrally connected at their lower inner ends, as indicated at 12. The end portions are suitably engaged by the arch bars through which they are inserted and provide sockets for the outer end of the truck-bolster 10. The truck-bolster is preferably tubular, as shown in Figures 1 and 6 of the drawing, and is supported within the casing by yieldable bolster spring 13. The car body bolster or transom 4 rests upon the truck-bolsters 10 which are free to move up and down in their respective casing as the truck springs yield to the pressure of the car body. To further sustain the weight of the car body and to prevent the truck springs from being unduly compressed under a too heavy load, side car bearings 14 are arranged upon the top of the arch bars above the end of the bolster casing and outside of the brake beam 15. The car transom, it is to be noted, is provided with an arch or notch at each brake beam to allow working of the same.

In the carrying out of the invention, each car truck has associated therewith two brake beams 15, one on each side of the truck and extending across an end 11 of the bolster casing with the brake shoe terminal over the top of the car wheel. By thus arranging the beams so that they are on top of the wheel rather than down near the bottom, as in the old way where some beams have a tendency to lift wheels up from the rails, many of the disadvantages and inconveniences of the old brake system are avoided. Under the old system, the brake beams are a constant menace and source of injury and damage. In winter, when the frost heaves the crossing planks up the least bit, they are apt to be caught and torn out by the low hanging brake beam and dragged great distances, sometimes ditching a car. Lumps of coal and other obstacles between the rails ofttimes tear off many of such brake beams. Again, when low hanging brake beams work loose, they usually drag ahead of the car wheels, catching ties, frogs and rails, or tearing up switch rods. When cars are ditched it is found impossible, many times, to set frogs where needed, because brake beams are so low they drag the frogs away before the car wheels ride onto them, thus damaging ties and track and causing long delay. By locating the brake beam on top of the wheels, therefore, it is safer and more convenient, and better results are obtained. Each brake beam 15 tapers outwardly from the center to the end, as illustrated, and may be of hollow construction, being provided upon the under side with openings or slots 15' for receiving the headed portion of the spring hangers and brake arm, indicated respectively at 16 and 17. Members 16 and 17 are each held in place by a yoke 18 and a pin 19, the latter passing through the head and engaging the yoke terminal as shown. The brake beam arm extends down through slots in the top of the truck-bolster and casing. These slots should only be long enough for the working of the arm.

Extending inwardly of each end of the truck-bolster, through slots in the side of the bolster and casing is a brake beam lever 20, having pivoted connection with the lower end of the brake beam arm. The portion of the arm below the end may be provided with a slight width to give the brake lever angle enough to clear the car wheel, or this may be accomplished by merely slotting the end of the arm at an angle where the point of connection is, as most clearly indicated in Figure 4; the pivot pin 21 serving to hold the members together. The brake lever is also pivoted to a bracket 22 fastened to the side of the bolster casing and the slot in the bolster through which the lever works should be long enough to permit the bolster to move up and down within the casing without interfering with the movement of the lever. Extending outwardly and upwardly from opposite sides of the casing to which they may be bolted or otherwise secured, are spring hangers or brake beam rods 23 having ends turned to fit into slots 15' in the brake beam and adjacent the end of the brake shoe. The lower end of each rod is fastened to the side of the casing down far enough below top of truck so that the brake beam can work low on bolster, since the car transom crosses the brake beam for engagement with the bearings on the outside of the beam. These rods hold the brake beam in place and also prevent them from coming down on wheels and being injured when a brake shoe is worn out. The lower ends of spring bolt 16 penetrate the guard, with a cotter pin or other locking element 24 engaging the end below the guard to lock it in place. Each bolt serves as a holder for springs 25 which encircle the bolt between the guard and the shoulder formed by the head of the bolt. These springs serve to hold the brake beams up and keep the brake shoes clear of the car wheels.

The brake elements of the device include a brake shoe head 26 and the brake shoe 27 which is detachable from the head and consequently replaceable. Each brake shoe is provided upon its back face with a projection 28 having an opening therethrough to receive the locking key 29. This projection fits through a slot in the head member which holds the shoe. The head member, as clearly seen in Figure 2 of the drawings, consists of upper and lower loop portions 30 and 31, oppositely disposed with respect to each other, and arranged so that the uppermost one is inserted into the open end of the brake beam and riveted to the top of the beam, as at 32; the lower loop engaging the under side of the beam and conforming to the curvature of the brake shoe which is snugly seated thereagainst. The shoe is held in place by the key, the head 33 of which swings down into a little slot or counter-bore in the brake head when in place, as indicated at 34, and is movable only when the head of the key is pried up. To raise the shoe key out of the slot and withdraw it from the brake head a tool, such as shown at 35, is provided. At present, brake shoes are replaced at a great inconvenience. It is often necessary to crawl under axle and truck to remove the shoes, often while reclining in mud and snow. With the brake beam on top of wheels this inconvenience and danger is done away with, as the shoes are replaced merely by shoving them in the shoe head at the end of beam.

To the under edge of the cross sills 3'—see Figure 3—or other suitable portion of the car frame, and intermediate the truck at either end, is pivoted the main lever 36 of the brake operating means. Connected to the opposite end of the main lever, at separate points, are the brake rods 37 and 38, respectively leading to the brake beam of the front and rear truck of the car. Chains 39 connect the brake rod with the brake beam levers 20. These chains pass upwardly from the brake levers over pulleys 40 attached to the under frame of the car above each lever and set at angles so that the vertex is at one end of the main lever. Consequently, movement of the main lever tends to simultaneously set the brake at both the trucks of the car. A hand brake rod 41 connects with the main lever at the end opposite to that at which the air piston 42 of the air brake cylinder 43 is connected. A chain 44 provides the connecting link between the hand brake rod and the short arm 45 of the brake mast 46. This arm, illustrated to advantage in Figure 5 of the drawings, takes up the slack, at the first-turn of the brake wheel 47, and provides for a quick and efficient braking power, beside which it prevents "choking" of chain, while at present many cars are damaged because of the failure of the brake to properly operate. When the brakes are operated by air, the hand brake rod end of the main lever is free to swing inwardly as the air piston forces the opposite end outwardly; such movement being permissible by reason of the flexible connection between the brake mast and main lever, as afforded by chain 44. The brake mast may extend vertically the end or side of a car in the usual manner with the short arm, however, properly positioned adjacent the lower end for convenient connection with the brake chain 44, the hand brake rod running back from the main lever with a hook at its end for engaging the same. In similar manner the beam brake rods may be hooked to their respective brake lever-chains.

In setting the brake the movement of main lever 36, whether operated by hand or by air exert a pull on the various brake rods, drawing the brake beam lever-chains over their respective pulleys and pivoting the brake levers so as to draw the brake beams down against the tension of springs 25, thus causing the brake shoes to bear upon the top of the car wheels. Putting pressure on top of wheels causes more friction between the carwheels and the rails, and moreover, each brake beam, it is to be noted, works on two pairs of wheels instead of but one pair, as at present, thereby preventing the sliding of wheels to a greater extent. Since the axles turn with the wheels, the pressure of the brake shoes against the wheels on one side of the car truck is necessarily communicated to the corresponding wheels on the opposite side of the truck, and hence, by arranging the brake beams as herein shown and described, it is obvious that the brake beams of each truck tends to co-operate with and reinforce each other, in applying the brakes to the wheels, with the result that flat wheels, which are a source of great expense, and relay to shipments, are to a large and appreciable extent avoided. With the removal of the settting force the reaction of the springs 25 lift the brake beams up and raise the brake shoes from the wheels, the parts of the mechanism assuming the relative positions illustrated in Figures 1 and 3 of the drawings.

It will be readily seen from the foregoing that the advantages of hanging the brake element in the manner herein set forth and described are manifold. There is not only a great amount of damage, expense, and delay to shipments avoided by the elimination of the sliding and flattening of the wheels, when the brakes are applied, but with brake beams on top of wheels, there is not that continuous wear on the brake shoes, nor resistance to the motion of a car as exists at the present time, whereby nearly every shoe on a train "drags" against the wheel so that, in switching, cars must often be kicked hard enough to damage couplers and freight, because of this resistance. It is apparent that various alterations in regard to the details of construction, size of parts, et cetera, may be resorted to in the practical application of the invention, and it is therefore, to be understood that the invention includes such changes, alterations, et cetera, as may properly fall within the scope of the appended claims.

Having thus fully described my invention, what I claim as new and desire to secure by Letters Patent is:—

1. A car brake including a brake beam arranged over corresponding wheels of a car truck, a bolster having one end disposed beneath the medial portion of the brake beam, brake beam rods secured to opposite sides of the bolster and having their upper ends arranged to slide on the brake beam to form guides therefor, bolts carried by the brake beam and depending therefrom to extend through the said brake beam rods, coil springs positioned upon said bolts for normally holding the brake beam raised above the car wheels, and means for moving the brake beam against the tension of said springs, whereby the beam is brought into braking position with relation to said car wheels.

2. A car brake including a brake beam provided with slots and arranged over corresponding wheels of the car truck, hanger arms projecting beneath the beams with the terminal ends inserted through the slots of the beam, springs on said arms for yieldably supporting the beam in raised position above the car wheels, brake shoes carried by the beam and brake operating means for drawing the beam downwardly against the supporting tendency of the springs on said arms whereby the brake shoes are brought into contact with the car wheels.

3. A car brake including a brake beam provided with a pair of slots and arranged above corresponding wheels of the car truck, brake members depending from the beam at opposite ends for contact with the car wheels, a bolster casing carried by the car truck, a pair of hanger rods secured to each side of the bolster casing and slidably extending into the slots of said beam, resilient means arranged between the hanger rods and the beam and normally tending to hold the beam with its braking members above the car wheels and means for lowering the beam against the lifting action of the resilient means whereby the hanger rods are caused to guide the beam as the latter is brought into braking contact with the car wheels.

In testimony whereof I affix my signature in presence of two witnesses.

HARRY LEE.

Witnesses:
 MAURICE FRANCIS BARRY,
 CARL D. CARTWRIGHT.